PRODUCTION OF TERPENE HYDROCARBON HYDROPEROXIDES

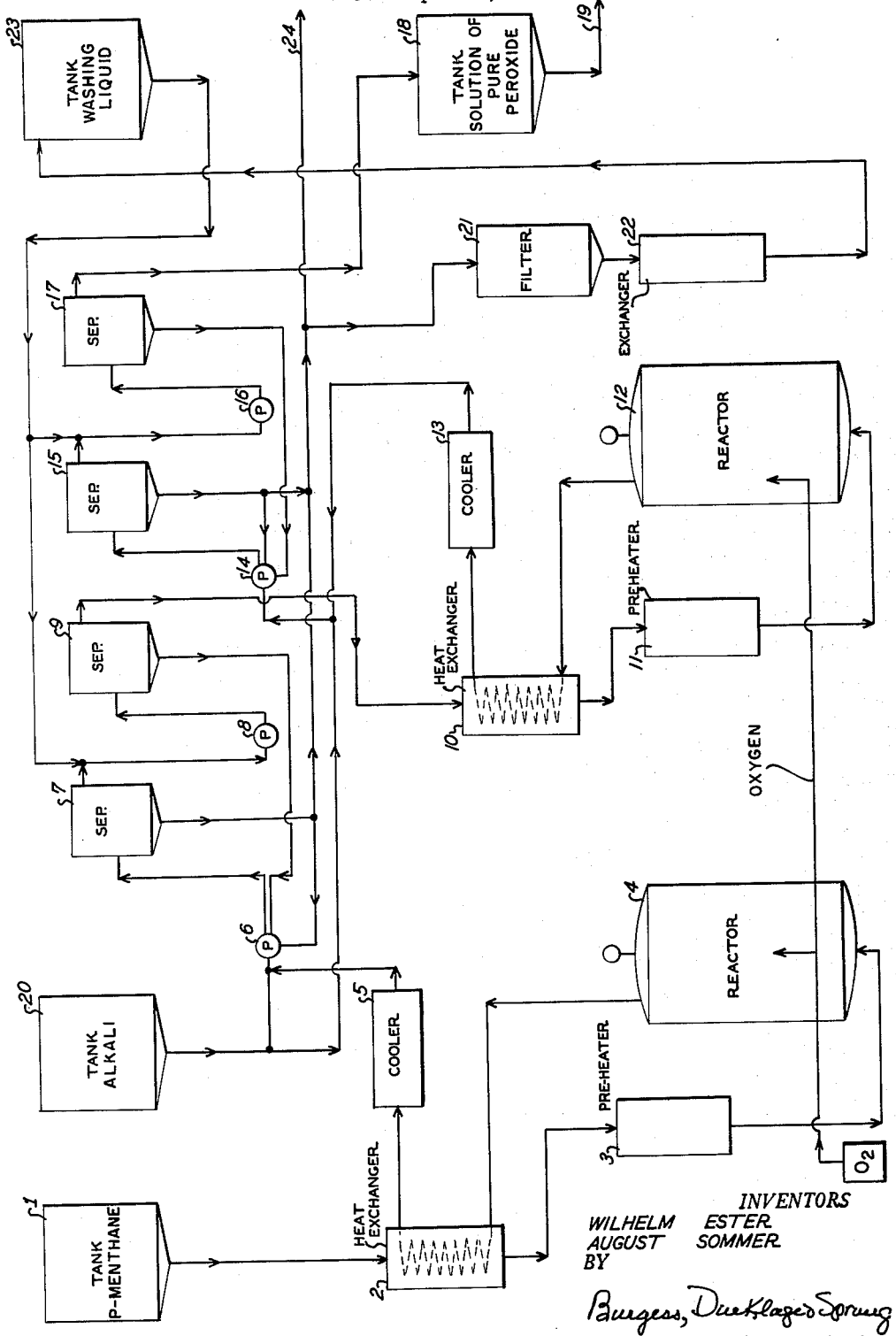

Wilhelm Ester and August Sommer, Herne, Germany, assignors to Bergwerksgesellschaft Hibernia Aktiengesellschaft, Herne, Germany, a corporation of Germany
Filed Sept. 21, 1964, Ser. No. 402,051
Claims priority, application Germany, June 28, 1958, B 49,439
5 Claims. (Cl. 260—610)

The invention is a continuation-in-part application of application Ser. No. 822,350, filed June 23, 1959 and now abandoned.

This invention relates to the production of terpene hydrocarbon hydroperoxides and provides a novel method for their production.

It is known that alkylaromatic hydrocarbons, as, for example, cumene, p-cymene, etc., may be oxidized with oxygen or oxygen-containing gases to the corresponding hydroperoxide. If the reaction is maintained for a sufficiently long period, hydroperoxide concentrations of from 50-60% can be obtained. The oxidation is preferably carried out in the presence of an alkaline material as, for example, aqueous alkali metal hydroxide, thereby assuring that the acid by-product formed in the oxidation will not detrimentally affect the hydroperoxide formed.

It is further known that the oxidation of the terpene hydrocarbons, such as limonene, pinane, carane, and p-menthane to the corresponding hydroperoxides cannot be carried out under the above conditions, since if the oxidation is continued to yields of a concentration of hydroperoxide of more than 10% referred to the oxidation reaction mixture, by-products are formed in such quantities that the process is not economically feasible. Furthermore, separation of the by-products from the reaction mixture is extremely difficult if not impossible. The by-products formed are primarily alcohols, as, for example, menthanol (8), menthanol (1), and menthanol (4) and ketones, as for example, 1-methyl-4-ethyl-cyclohexanone (8), 5-ethyl-6-methyl-heptanone (2) and 3,7-dimethyloctanone (6). Oxidation in the presence of alkali, contrary to what was to be expected, results in an even more increased by-product formation.

It has been found that the formation of by-products can be substantially restricted and that almost theoretical yields of the hydroperoxides of the terpene hydrocarbons, as, for example, p-menthane, pinane, etc., can be obtained by contacting a terpene hydrocarbon with oxygen or oxygen-containing gases for a time sufficient that a hydroperoxide concentration of from 5 to 10% is obtained, intimately mixing the hydroperoxide solution thus obtained with a dilute alkaline solution and thereafter separating the upper layer consisting of the hydroperoxide and hydrocarbon. The hydrocarbon-hydroperoxide fraction is then washed with a suitable washing agent substantially immiscible with said hydrocarbon-hydroperoxide fraction whereby there is obtained a very pure hydroperoxide The washed layer containing the hydroperoxide and hydrocarbon and which is substantially free of any alkali is preferably subjected to a distillation treatment in order to obtain a hydroperoxide solution of higher concentration, e.g. a 54% by weight solution which can be used as activating agent in polymerization reaction. It is also possible to subject this washed layer one more time to the oxidizing reaction as set forth above, producing yields of up to 30% hydroperoxide.

The reaction is carried out as follows: the starting terpene hydrocarbon is reacted with oxygen or oxygen containing gas, e.g., air, at a temperature of about 100 to about 140° C. If the oxygen containing gas is introduced at temperature below 100° C. into the hydrocarbon, then no oxidation takes place. If the oxidation temperature of 140° C. is exceeded, then considerable disintegration of the formed hydroperoxide results. The disintegration products thereby formed are undesirable since the same exercise a disturbing effect on the oxidation reaction. If necessary, ozone may be supplied to the reaction either continually or intermittently. The oxidation may be effected at normal pressure or at elevated pressures of, for example, up to about 10 atmospheres. The hydroperoxide solution obtained containing, for example, approximately 7% hydroperoxide is then briefly but intimately mixed with a dilute aqueous or alcoholic solution or suspension of an alkaline material. Particularly suitable for this purpose are the carbonates and hydroxides of alkali and alkaline earth metals. It has been found particularly desirable to effect the mixing of the hydroperoxide solution and alkaline solution or suspension in a centrifugal pump. If a centrifugal pump is employed for the mixing, a mixing time of below 5 seconds suffices, the preferred mixing time lying between 0.2–0.8 second. Of course, other means than the centrifugal pump may be used to effect the mixing, as, for example, stirring devices, such as blade stirrers. However, in that situation, the stirring must be effected over a period of several minutes as, for example, for up to 15 minutes. The intimately blended mixture of alkali and hydroperoxide solutions is then conducted into a separator where it is separated into an aqueous and organic phase. The upper layer, which consists of the hydroperoxide dissolved in the unconverted hydrocarbon, is in the form of an emulsion and must be further treated before it can be further processed. The aforesaid emulsion can be broken into component parts by contacting the same in a second centrifugal pump or separator with a suitable washing agent substantially immiscible with said organic upper layer as, for example, water, a mono- or poly-valent alcohol, such as methanol, glycol, etc. There is thereby obtained a very rapid and complete separation in two layers wherein the upper layer consists of a very pure solution of hydroperoxide. The lower layer, which still contains considerable quantities of hydroperoxide and hydrocarbon, is returned to the first alkaline washing step, thereby avoiding any substantial losses. The lower layer is introduced at the first centrifugal pump before the first separator, thereby bringing about a dilution of the alkali directly in the apparatus and additionally permitting the reuse of the alkaline agent.

In accordance with the invention, the process can be carried out continuously. The continuous processing is carried out by feeding into the oxidation vessel that same amount of starting terpene hydrocarbon as is drawn off in hydroperoxide solution. The starting hydrocarbon is fed into the centrifugal pump in which it is mixed with the alkaline solution. Thereafter the mixture goes to the first separator, from which the upper layer is continuously drawn off. The upper layer is washed in the subsequent pump with a washing agent substantially immiscible with said upper layer such as water or alcohol. The lower layer from the first separator remains partially in circulation. A partial stream thereof is continually drawn off and replaced by fresh alkali solution. The drawn-off aqueous or alcoholic solution may be purified through filtration and ion-exchange and again fed into the washing process. The lower layer from the second separator then only is passed back to the first separator. The hydroperoxide solution obtained as the upper layer from the second separator can be again subjected to oxidation and the resultant oxidation product again subjected to a washing process, or the same may be processed in the customary manner as, for instance, by vacuum distillation and, if necessary, employing a film evaporator.

The invention will now be described by way of specific embodiments thereof. These embodiments are set forth in the following examples which may be more easily understood with reference to the accompanying drawing:

*Example 1*

From container 1 there is fed hourly a quantity of 30 liters of p-menthane to the heat exchanger 2, and then preheater 3 and to the reactor 4 which is maintained at pressure of 2 atmospheres. The reaction temperature is, through cooling, kept at 120° C. Per hour there is fed into the reactor 4, 0.33 m.$^3$ oxygen. The oxygen is so introduced that it enters directly into the reaction liquid. The point of introduction of the oxygen lies below the liquid's surface. The introduction of the oxygen may take place in a punctiform manner but the oxygen may also be introduced in finely distributed form, as, for instance, through a frit. The amount of oxygen introduced is so regulated that only that amount of oxygen is introduced that the final gas contains at the maximum no more than 2% oxygen. With a higher oxygen content in the final gas, the danger of explosion always exists. The gas flowing off is, by supplying nitrogen, held to below 2% oxygen constituents. The oxidized product leaving the reactor has a peroxide concentration of 8.1%; its acid number amounted to 3.55 mg. KOH/g. The hydroperoxide is dissolved in the unconverted hydrocarbon. This product is, after conduction over heat exchanger 2 and through cooler 5, fed into a centrifugal pump 6, in which it is contacted with an alkali- or alkali-carbonate-solution supplied from container 20. Then it is fed to separator 7. The separated upper layer is conducted into pump 8 where it is washed with washing liquid supplied from container 23 and the mixture is then pumped into separator 9. The lower layer formed in separator 9 is fed, together with the alkali-solution from container 20 into pump 6 and serves to dilute the concentrated alkali. The lower layer from separator 7 is partially fed to pump 6. The excess is fed hourly to filter 21 and exchanger 22 and from there to container 23 or is drawn off into conduit 24. The upper layer of the separator 9 is a pure, neutral in reaction, hydroperoxide solution. This is fed to the heat exchanger 10, and preheater 11 to the reactor 12, in which the oxidation is carried out to about a concentration of 17%. The reaction product from reactor 12 is then passed through heat exchanger 10 into cooler 13 to a second alkaline washing process. The peroxide concentration of this product amounts to 17.0% and its acid number is 4.1 mg. KOH/g.

The second washing is carried out in pumps 14 and 16 and separators 15 and 17 respectively exactly as described in the first instance. There is obtained a neutral pure peroxide solution which may once more be subjected to an oxidation, or which may be drawn off as shown in the drawing to container 18 which serves as the storage container for supplying a film evaporator 19 which evaporator is not shown in the drawing. In this manner the p-menthane-hydroperoxide may be concentrated up to the desired concentration. The distilled p-menthane is recycled to container 1. In 150 hours there were obtained in this apparatus 780 kilos of p-menthane-hydroperoxide. This product was practically free from disturbing by-products. At the same time (in the same time), 649 kilos of p-menthane were used. Thus, the yield of p-menthane-hydroperoxide amounts in this process to about 94%. The soda (sodium carbonate) used in this process amounted to about 10 kilos.

*Example 2*

As in Example 1, α-pinane was oxidized. There was required 1.9 m.$^3$ air/h. and the final gas had an oxygen concentration of 2%. The peroxide solution emerging from the reactor had a concentration of 10.9%, the acid number amounted to 3.9 mg. KOH/g. As in Example 1, after the alkali treatment and washing and a second oxidizing step a concentration of 21.8% hydroperoxide was obtained, the oxidized product having an acid number of 5.2 mg. KOH/g. The pure peroxide solution which was obtained after the second alkali treatment was drawn off and concentrated. In 120 hours there was obtained 800 kilos of α-pinanehydroperoxide. 678 kilos of α-pinane were used. Thus the yield amounted to 96%. About 7 kilos of soda were consumed in the reaction.

*Example 3*

The procedure of Example 2 was employed with limonene as the hydrocarbon which was oxidized. There was obtained limonene-hydroperoxide in a yield of 94%. In 120 hours 780 kilos of limonene hydroperoxide were recovered, the soda used up amounting to about 6 kilos.

*Example 4*

The procedure substantially as outlined in Example 2 was followed, carane being oxidized. There was obtained caranehydroperoxide. The yield was about 95%. In 125 hours there was recovered 824 kilos of caranehydroperoxide. The soda used up was about 7 kilos.

*Example 5*

Again the procedure of Example 2 was followed with camphane being oxidized. There was obtained camphane-hydroperoxide in a yield of 96%. In 118 hours there was recovered 815 kilos camphanehydroperoxide. The soda used up amounted to about 6 kilos.

We claim:

1. Process for the preparation of terpene hydrocarbon hydroperoxides which includes in a first reaction sequence,
    (A) oxidizing a terpene hydrocarbon with a gas containing oxygen for a time sufficient to produce a reaction product having a terpene hydrocarbon hydroperoxide concentration of about 5–10%,
    (B) intimately mixing the resulting reaction product mixture containing terpene hydrocarbon hydroperoxide with a dilute solution of an alkaline reacting material selected from the group consisting of alkali metal and alkaline earth metal carbonates and alkali metal and alkaline earth metal hydroxides in a solvent selected from the group consisting of water, glycols and monovalent alkanols whereby the acids formed in said oxidizing step are neutralized,
    (C) separating the organic phase comprising terpene hydrocarbon hydroperoxide and unconverted terpene hydrocarbon from the solution of alkaline reacting material in the resulting intimate mixture,
    (D) contacting the separated organic phase with a liquid washing agent substantially immiscible with said organic phase and being selected from the group consisting of water, glycols, and monovalent alkanols, whereby there are formed two layers comprising an upper layer organic phase consisting of substantially pure hydroperoxide and unconverted terpene hydrocarbon and a lower layer comprising a mixture of said liquid washing agent, terpene hydrocarbon hydroperoxide and terpene hydrocarbon, separating and recovering said upper layer organic phase consisting of substantially pure hydroperoxide and unconverted hydrocarbon, and
    (E) recycling the washed and separated upper layer from step D consisting of pure terpene hydrocarbon hydroperoxide and unconverted terpene hydrocarbon to a second reaction sequence including the sequential steps A–D as above set out thereby producing additional terpene hydrocarbon hydroperoxide and recovering by distillation said terpene hydrocarbon hydroperoxide from the upper layer produced in step D of said second reaction sequence and representing the total of the terpene hydrocarbon hydroperoxide contained in the upper layer organic phase produced in step D of said first and second reaction sequences.

2. Process according to claim 1 which comprises effecting said process continuously.

3. Process according to claim 1 wherein said alkaline reacting material is sodium carbonate.

4. Process for the preparation of p-menthane hydroperoxide, which comprises in a first reaction sequence,
 (A) oxidizing p-menthane with an oxygen containing gas for a time sufficient to produce a reaction product having a p-menthane hydroperoxide concentration of about 5–10%,
 (B) intimately mixing the resulting reaction product mixture containing the p-menthane hydroperoxide with a dilute aqueous solution of sodium carbonate whereby the acids formed in said oxidizing step are neutralized,
 (C) separating the intimate mixture thereby formed into an upper layer organic phase comprising p-menthane hydroperoxide and unconverted p-menthane and a lower layer aqueous phase,
 (D) contacting the separated upper layer organic phase from step C with a washing agent consisting of an aqueous solution of sodium carbonate, whereby there are formed an upper layer organic phase consisting of substantially pure p-menthane hydroperoxide and unconverted p-menthane and a lower layer comprising a mixture of said liquid washing agent, p-menthane and p-menthane hydroperoxide, and
 (E) recycling the washed and separated upper layer organic phase from step D consisting of p-menthane hydroperoxide and unconverted p-menthane to a second reaction sequence including the sequential steps A–D as above set out thereby producing additional p-menthane hydroperoxide and recovering by distillation said p-menthane hydroperoxide from the upper layer produced in step D of said second reaction sequence and representing the total of the p-menthane hydroperoxide contained in the upper layer organic phase produced in step D of said first and second reaction sequences.

5. Process for the preparation of terpene hydrocarbon hydroperoxides which includes in a first reaction sequence,
 (A) oxidizing a terpene hydrocarbon with a gas containing oxygen for a time sufficient to produce a reaction product having a terpene hydrocarbon hydroperoxide concentration of about 5–10%,
 (B) intimately mixing the resulting reaction product mixture containing terpene hydrocarbon hydroperoxide with a dilute solution of an alkaline reacting material selected from the group consisting of alkali metal and alkaline earth metal carbonates and alkali metal and alkaline earth metal hydroxides in a solvent selected from the group consisting of water, glycols and monovalent alkanols whereby the acids formed in said oxidizing step are neutralized,
 (C) separating the organic phase comprising terpene hydrocarbon hydroperoxide and unconverted terpene hydrocarbon from the solution of alkaline reacting material in the resulting intimate mixture,
 (D) contacting the separated organic phase with a liquid washing agent substantially immiscible with said organic phase and being selected from the group consisting of water, glycols, and monovalent alkanols, whereby there are formed two layers comprising an upper layer organic phase consisting of substantially pure hydroperoxide and unconverted terpene hydrocarbon and a lower layer comprising a mixture of said liquid washing agent, terpene hydrocarbon hydroperoxide and terpene hydrocarbon, separating and recovering said upper layer organic phase consisting of substantially pure hydroperoxide and unconverted hydrocarbon.

References Cited by the Examiner

UNITED STATES PATENTS 2,863,882  12/1958  Bain et al. _____ 260—610 X

LEON ZITVER, *Primary Examiner.*

H. G. MOORE, J. E. EVANS, *Assistant Examiners.*